though these known pretreatments produce an increase in the reactivity of the cellulose to esterification, they do not produce a truly rapid esterification rate. Even with the best of these treatments undesirably long esterification times are required. Because of the large investment in equipment required to produce large quantities of a cellulose derivative, such long times of reaction are economically unattractive.

UNITED STATES PATENT OFFICE 2,585,516

PREPARATION OF IMPREGNATED CELLULOSE AND CELLULOSE ESTERS THEREFROM

John Cunningham Thomas, Wilmington, Del., assignor to E. I. du Pont de Nemours & Company, Wilmington, Del., a corporation of Delaware No Drawing. Application March 23, 1948, Serial No. 16,621

15 Claims. (Cl. 260—229)

This invention relates to cellulosic material and more particularly to the modification of cellulosic material and to the provision of new cellulosic compositions having greatly increased chemical reactivities.

Cellulosic materials have varying degrees of reactivity to chemical reagents, e. g., to esterifying agents, depending on various factors, such as the source of the cellulose and the particular isolating and purifying methods. Also, cellulosic materials are often subjected to pretreatments of various types to increase chemical reactivity and to improve the quality of the products obtained. Many pretreating agents, including organic and inorganic acids, and their neutral, acidic or basic salts, have been proposed for modifying the reactivity of cellulosic material. Some of these pretreatments, especially those involving pretreatment with organic acids, have achieved commercial success. Although these known pretreatments produce an increase in the reactivity of the cellulose to esterification, they do not produce a truly rapid esterification rate. Even with the best of these treatments undesirably long esterification times are required. Because of the large investment in equipment required to produce large quantities of a cellulose derivative, such long times of reaction are economically unattractive.

Accordingly, it is an object of this invention to provide cellulosic compositions which are highly reactive to such chemical reactions as esterification. A further object is the provision of a method for the preparation of new reactive compositions. A still further object is the provision of a process for the rapid chemical modification of cellulose. Other objects appear hereinafter.

Cellulosic materials having greatly increased reactivity to esterification and other reactions are prepared by this invention by impregnating the cellulosic material with a mixture of (1) a corboxylic acid compound and (2) a compound of an inorganic sulfoxy acid. By "carboxylic acid compound" is meant an amide or a salt of a carboxylic acid with ammonia or an amine having at least one amino hydrogen; by a "compound of an inorganic sulfoxy acid" is meant a compound of an inorganic oxygen acid of sulfur, such as sulfuric acid, its partial esters or amides, sulfurous acid, thiosulfuric acid, tetrathionic acid, persulfuric acid or a salt of any of these with ammonia or an amine having at least one amino hydrogen. The resultant impregnated cellulose is then chemically modified by treatment with a derivative-forming agent which is active therewith, such as an aldehyde or an anhydride. These react with the reactive cellulose through its hydroxyl groups to form acetals or esters. For example, cellulose so impregnated is highly reactive, being substantially completely esterified in an extremely short time with aliphatic acid anhydrides.

Since the sulfuric acid compounds which are included in the second of the two types of impregnants defined above are generally more stable and more readily available than the other inorganic sulfur oxygen acid compounds, they are preferred for use in the practice of this invention. These sulfuric acid compounds have the general formula

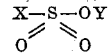

wherein X, for example, is —NH$_2$, —OR, —OH, —ONH$_4$, —ONH$_3$OH, —ONH$_3$NH$_2$, —ONH$_2$R$_2$ or —ONH$_3$R and Y, for example, is —H, —NH$_4$, —NH$_3$OH, —NH$_3$NH$_2$, —NH$_2$R or —NH$_2$R$_2$, the R in these radicals being monovalent, aliphatic or aromatic, alicyclic or heterocyclic organic radicals. Since combinations of amides of carboxylic acids with sulfuric acid or its ammonium or substituted ammonium salts impart the greatest reactivity to cellulose, they are especially preferred in the practice of this invention.

The invention is illustrated in greater detail by the following examples in which the proportions of ingredients are expressed in parts by weight unless otherwise noted and in which, for convenience, time of esterification has been used as the measure of reactivity.

EXAMPLE I

Sixty parts of ammonium acetate and 20 parts of ammonium sulfate are dissolved in 120 parts of water at room temperature. Into the resulting solution is immersed 10.4 parts of cotton linters of the grade commonly used for the manufacture of cellulose acetate and containing 4% moisture (equivalent to 10 parts of cellulose on an oven-dry basis). After immersion for one half hour the impregnated linters are centrifuged to a total of 20 parts and then dried in a vacuum desiccator over anhydrous calcium chloride for two days at room temperature. The resulting impregnated linters containing, as a total, 3.5 parts of ammonium acetate and ammonium sulfate in the ratio of 3:1 are placed in 300 parts of acetic anhydride refluxing in a reaction vessel fitted with a reflux condenser and agitating means. After about 30 seconds heating with agitation the cellulose is highly swollen. In about one minute it is almost disintegrated, and the liquid has started to boil vigorously. After about 1.5 minutes from the start of the reaction the linters are practically completely in solution, but the reaction mixture is still cloudy. After about three minutes, a clear solution results. This is immediately poured, rapidly and with vigorous agitation, into 2000 parts of an aqueous 10% acetic acid solution at 65° C. The resulting white, flocculent precipitate of cellulose acetate is stirred for 15 minutes, filtered, and washed with distilled water. The wet product is stirred in 2000 parts of distilled water, filtered, and washed again. After repeating this washing procedure twice, the cellulose acetate is dried at 65° C. A yield of 18 parts of white, fluffy cellulose acetate having a combined acetic acid content of 62.2%, 0.10% combined sulfate, and a degree of polymerization (D. P.) of 450 is obtained. (D. P. calculated by Staudinger's equation from the intrinsic viscosity of a dilute solution of the cellulose acetate in glacial acetic acid; see pages 927-929 of "High Polymers, vol. V, Cellulose and Cellulose Derivatives," Interscience Pub. Inc. 1943; edited by Ott.)

Although the product is only slightly soluble in glacial acetic acid at room temperature, it dissolves readily at the boiling point, and it does not precipitate when the solution is cooled to room temperature. It is readily soluble in methylene chloride and insoluble in acetone.

EXAMPLE II

Cotton linters (10.4 parts) containing 4% moisture are immersed for one-half hour at room temperature in a solution containing 36 parts of urea, 4 parts of ammonium sulfate and 160 parts of water. The uniformly impregnated linters are centrifuged to a total weight of 20 parts and then dried in a vacuum desiccator over anhydrous calcium chloride for two days at room temperature. The linters, containing 1.8 parts of urea and 0.2 part of ammonium sulfate in 10 parts of dry cellulose, are added to 300 parts of acetic anhydride at room temperature in the reaction vessel fitted with agitation means and external means for heating the reaction mixture. Heating and stirring are started immediately, and in from three to five minutes the temperature reaches about 90° C. There is no change in the appearance of the linters until ten minutes after the beginning of the heating period. In the time from ten to fifteen minutes after heating and stirring are started, the linters swell, disintegrate, and form first a cloudy, grainy solution and finally a slightly cloudy, smooth solution. After sixteen and one-half minutes the product is precipitated and purified by the method of Example I. The resulting cellulose acetate has a combined acetic acid content of 62.4% and a D. P. of 695.

EXAMPLE III

Ten parts of cotton linters impregnated with 4.5 parts of urea : ammonium sulfate in the ratio 19:1 is prepared by immersing 10.4 parts of cotton linters containing 4% moisture in an aqueous solution consisting of 76 parts of urea and 4 parts of ammonium sulfate in 120 parts of water by the procedure of the preceding examples. The dried, pretreated linters are added to 300 parts of propionic anhydride in a reaction vessel of the type described in Example II, and the reaction is carried out as described in that example. After heating and stirring for ten minutes, the linters are somewhat swollen, but they do not become excessively swollen until about one hour after heating is started. They then disintegrate, and the reaction mixture finally becomes a smooth, slightly cloudy solution one hour and eight minutes after heating and stirring have been started, as described in Example II. The cellulose propionate is isolated as a gummy precipitate by pouring the reaction mixture immediately into 2000 parts of aqueous 10% acetic acid at 65° C. To the mixture is added 1000 parts of distilled water. After about fifteen minutes of vigorous agitation the precipitate solidifies to a granular white solid. This is purified and dried by the procedure of Example I. There is thus obtained 20 parts of granular white cellulose propionate having a combined propionic acid content of 67.3%, a combined sulfate content of 0.11%, and a D. P. of 215.

EXAMPLE IV

Ten and four-tenths parts of cotton linters containing 4% moisture is immersed for one-half hour in a solution of 70 parts of urea and 10 parts of ammonium sulfate in 120 parts of water and then centrifuged to a total of 20 parts. After drying in the usual way, the linters, containing 3.5 parts of urea and 0.5 part of ammonium sulfate, are added to a refluxing mixture of 40 parts of acetic anhydride and 225 parts of xylene (134° C.) contained in the reaction vessel described above. After heating the mixture for five minutes under these conditions, about one-third of the fibrous material is removed from the reaction mixture, pressed to remove traces of reaction liquid, washed with xylene and then with alcohol, washed acid-free with distilled water, and dried in a vacuum desiccator at room temperature (product A). After ten minutes approximately one-half of the fibrous material remaining in the raction mixture is removed and worked up by the same procedure (product B). After fifteen minutes the remainder of the linters, which still retain their fibrous state, are filtered from the reaction liquid and worked up in the same manner (product C). The properties of the three products thus obtained are listed in the following Table I:

*Table I*

| Product | Time, Min. | Per cent Comb. AcOH | Per cent Comb. Sulfate | D. P. | Acetic Acid Solubility |
|---|---|---|---|---|---|
| A | 5 | 11.6 | 2.10 | | Insol. |
| B | 10 | 59.3 | 1.00 | 320 | Soluble. |
| C | 15 | 61.0 | 0.73 | 265 | Do. |

EXAMPLE V

Ten parts of cotton linters impregnated with 3 parts of acetamide : ammonium sulfate in the ratio of 38:2 is prepared by immersing 10.4 parts of linters containing 4% moisture in an aqueous solution consisting of 76 parts of acetamide, 4 parts of ammonium sulfate, and 120 parts of water by the procedure described in Example II. The dry, impregnated linters are added to 300 parts of acetic anhydride at room temperature in the reaction vessel described above. Heating and stirring are started immediately, and in from 3 to 5 minutes, the temperature reaches about 90° C. The linters are swollen 4 minutes after heating was begun and are disintegrating after 8 minutes. Disintegration and dissolution take place gradually, and after 18 minutes, a cloudy, grainy solution is obtained. After 20 minutes, the cloudiness is somewhat reduced and the solution is completely smooth. After 26 minutes, the product is precipitated, washed, and dried by the procedure described in Example I. There is obtained 17 parts of white, fluffy cellulose acetate containing 62.1% combined acetic acid and having a D. P. of 760.

EXAMPLE VI

Cotton linters (10.4 parts) containing 4% moisture are immersed in a solution of 60 parts of morpholinium acetate and 20 parts of morpholinium sulfate in 120 parts of water for one-half hour at room temperature. The uniformly impregnated linters are centrifuged to a total weight of 20 parts and then dried in the usual way. The linters, containing 4 parts of morpholinium acetate and morpholinium sulfate in the ratio of 3:1, are placed in 300 parts of acetic anhydride refluxing in a reaction vessel similar to that described in Example I. Disintegration of the linters and vigorous ebullition of the liquid begin immediately upon contact of the linters with the hot anhydride, and after 15 seconds, a clear, colorless solution is obtained and ebullition has ceased. After 30 seconds, the product is precipitated by pouring this solution, rapidly and with vigorous agitation, into 2000 parts of an aqueous 10% acetic acid solution at 65° C. The white flocculent precipitate is washed and dried by the procedure described in Example I. There is thus obtained 17.5 parts of cellulose acetate containing 62.5% combined acetic acid and having a D. P. of 470.

Other impregnants and particular combinations of these which are useful in the practice of this invention are illustrated in the following Table II. This table shows, in addition to a variety of different impregnants used in different proportions on cotton linters, the results of the acetylation of the resulting impregnated linters. The impregnations were carried out by the general procedure described in Example I, and the pretreated celluloses were acetylated by the general procedures outlined in Examples I and II. In this table the reaction time refers to the time measured from the instant the impregnated linters were added to the anhydride.

*Table II*

PRETREATMENT AND ACETYLATION OF CELLULOSE

| Pretreatment | | Acetylation | | | |
|---|---|---|---|---|---|
| | | Reaction | | Analysis of Cell. Acetate | |
| Impregnants | Per Cent Based on Dry Cellulose | Temp., °C. | Time, Min., Sec. | Per Cent Combined AcOH | D. P. |
| Ammonium formate:ammonium sulfate | 30:10 | 140 | 4:00 | | 415 |
| Ammonium acetate:ammonium sulfate | 38:2 | 140 | 6:00 | 62.5 | 330 |
| Do | 35:5 | 140 | 3:00 | 62.4 | 480 |
| Do | 20:20 | 140 | 5:00 | 63.0 | 225 |
| Do | 10:30 | 140 | 5:00 | 63.0 | 145 |
| Do | 8:24 | 140 | 5:00 | 61.8 | 175 |
| Do | 30:10 | 90 | 105:00 | 62.0 | 490 |
| Do | 10:30 | 90 | 70:00 | 61.3 | 440 |
| Ammonium glycolate:ammonium sulfate | 35:5 | 140 | 1:30 | 62.4 | 505 |
| Ammonium salicylate:ammonium sulfate | 30:10 | 140 | 3:00 | 62.2 | 335 |
| Ammonium adipate:ammonium sulfate | 21:7 | 140 | 8:30 | 62.8 | 165 |
| Hexamethylenediammonium adipate:ammonium sulfate | 35:5 | 140 | 2:30 | 62.5 | 475 |
| Urea:ammonium sulfate | 38:2 | 140 | 1:30 | 62.2 | 585 |
| Do | 35:5 | 140 | 2:00 | 62.2 | 495 |
| Do | 18:2 | 140 | 3:30 | 62.2 | 475 |
| Do | 8:2 | 140 | 8:00 | 61.2 | 320 |
| Do | 39.5:0.5 | 90 | 49:00 | 62.3 | 730 |
| Do | 38:2 | 90 | 18:00 | 61.4 | 720 |
| Do | 35:5 | 90 | 15:00 | 62.2 | 635 |
| Acetamide:ammonium sulfate | 35:5 | 140 | 3:00 | 62.2 | 475 |
| Glycolamide:ammonium sulfate | 35:5 | 140 | 3:00 | 62.5 | 415 |
| Ammonium acetate:ammonium bisulfate | 35:5 | 140 | 3:30 | 62.1 | 470 |
| Ammonium acetate:hydrozylammonium sulfate | 35:5 | 140 | 5:00 | | |
| Ammonium acetate:ethylene diammonium sulfate | 35:5 | 140 | 5:00 | | |
| Methylammonium acetate:methylammonium sulfate | 35:5 | 140 | 1:30 | 61.2 | 545 |
| Diethylammonium acetate:diethylammonium sulfate | 35:5 | 140 | 3:00 | 60.9 | 480 |
| Do | 30:10 | 90 | 25:00 | 58.3 | 295 |
| Morpholinium acetate:morpholinium sulfate | 30:10 | 140 | 1:00 | 62.6 | 530 |
| Do | 30:10 | 90 | 15:00 | 62.5 | 645 |
| Piperidinium acetate:piperidinium sulfate | 30:10 | 140 | 1:00 | 62.4 | 495 |
| Urea:ammonium bisulfate | 35:5 | 140 | 3:00 | 62.4 | 315 |
| Urea:sulfuric acid | 39:1 | 140 | 5:00 | 61.3 | 530 |
| Do | 39.62:0.38 | 90 | 54:00 | 61.9 | 750 |
| Do | 39:1.5 | 90 | 22:00 | 62.1 | 720 |
| Urea:Sulfamic acid | 38.3:1.7 | 140 | 1:30 | 1.8 | 585 |
| Urea:ammonium sulfamate | 38:2 | 140 | 1:30 | 62.2 | 555 |
| Do | 39:1 | 90 | 30:00 | 62.3 | 750 |
| Urea:morpholinium sulfamate | 36.8:3.2 | 140 | 1:30 | 61.8 | 580 |
| Urea:diethylammonium sulfamate | 37:3 | 140 | 2:00 | 62.2 | 485 |
| Urea:hydrazine sulfate | 38:2 | 140 | 1:30 | 62.0 | 595 |
| Do | 38:2 | 90 | 18:30 | 62.2 | 720 |
| Urea:Morpholinium sulfate | 36:4 | 140 | 1:30 | 62.6 | 585 |
| Do | 36:4 | 90 | 17:30 | 62.1 | 685 |
| Urea:Ammonium methyl sulfate | 38:2 | 140 | 6:00 | 62.8 | 430 |
| Do | 36:4 | 140 | 1:00 | 62.4 | 635 |
| Do | 38:2 | 90 | 17:00 | | |
| Urea:Ammonium dodecyl sulfate | 31.2:8.8 | 140 | 1:00 | 62.1 | 515 |
| Urea:ammonium sulfite | 38.2:1.8 | 140 | 1:30 | 61.8 | 540 |
| Urea:diethylammonium sulfite | 35.3:4.7 | 140 | 1:30 | | 525 |
| Urea:ammonium thiosulfate | 37.8:2.2 | 140 | 7:00 | 62.4 | 430 |
| Do | 34.4:5.6 | 140 | 1:30 | | |
| Urea:ammonium tetrathionate | 36:4 | 140 | 1:00 | | 505 |
| Urea:ammonium persulfate | 36.5:3.5 | 140 | 1:30 | | 315 |

From the above table it is evident that highly reactive cellulose is obtained by impregnation of cellulosic material with aqueous solutions of the above-defined impregnants in a variety of total concentrations, and in a variety of ratios between the two types of impregnants. The minimum total concentration (expressed as per cent of the dry weight of cellulose) of impregnants operable in this invention is about 10%; however, concentrations of 20% to 40%, and especially when used in aqueous solutions of 20% to 40% concentration, are preferred since these produce the most rapid reaction on subsequent esterification. Concentrations lower than 10% and higher than 40% may be used if desired. In the interest of rate of reaction and consumption of materials there is no particular advantage in using the lower or higher concentration. The optimum concentration depends on the particular impregnants being employed. For example, urea compositions of 20% total concentration are as effective as 30% to 40% concentrations of ammonium acetate compositions containing the same sulfate components.

The ratios of the carboxylic acid compound to the compound of the inorganic sulfoxy acid which are operable in the practice of this invention range from about 80:1 to 1:3; the preferred ratios being partly dependent on the amount of combined acid in the sulfur acid derivative. It is necessary to use an impregnating composition containing a minimum of 1% (based on weight of cellulose) of ammonium sulfate or an amount of amine sulfate or other sulfur acid derivative equivalent in acid content to obtain the highest rate of acetylation. In any particular series of impregnating compositions containing different proportions of the same ammonium salt of a carboxylic acid and the same sulfur acid derivative, those compositions containing the larger amounts of sulfur acid compound produce cellulose esters having lower degrees of polymerization. Therefore, when highest molecular weight cellulose esters are desired it is preferable to use impregnating compositions containing the lower percentages of sulfoxy acid compound within the above-defined limit. Moreover, when a free inorganic oxygen acid of sulfur is used in the impregnating mixture, the ratio of the carboxylic acid compound to the sulfur acid should be at least 3 to 1. The optimum concentration of sulfoxy acid compound within these general ranges depends on the particular impregnants and the particular reaction temperatures employed.

Other specific impregnants of the defined types can also be employed. Among other carboxylic acid compounds which can be used are aniline acetate and aniline propionate. Among other inorganic sulfur oxygen acid compounds which are operable is aniline sulfate.

In the preferred method for carrying out this invention cellulosic material, such as, for example, cotton linters or wood pulp, is immersed in an aqueous solution containing the two above-defined types of impregnants in total concentrations of from 20% to 40% by weight, and in which mixture the ratios of the carboxylic acid compound to the compound of the inorganic sulfoxy acid range between about 4:1 and 3:1. This is conveniently done by immersing the cellulose in an excess of an aqueous solution containing the impregnants in the above-defined concentrations and ratios for about one-half hour at room temperature. Longer times of impregnation can be used if desired, but usually one-half hour is sufficient to obtain uniform impregnation. The excess liquid is removed from the impregnated cellulose by conventional means, such as by filtration under pressure or under vacuum or by centrifuging. The last method is especially preferred because of the reproducibility of the results obtained. The amount of solution left in the cellulose will of course depend on the amount of solid impregnant desired in the cellulose, on the concentration of the impregnating solution used, and on the particular method of treatment being employed. When impregnating solutions of 20% to 40% total concentration are used, it is convenient to centrifuge the cellulose to a wet weight double that of the dry cellulose. After centrifuging or pressing to the desired wet weight, the impregnated cellulosic material is usually but not necessarily dried by exposing it to the action of a desiccant at atmospheric or decreased pressure, or by exposing it to a current of air at ordinary or moderately elevated, e. g., 50°–75° C. temperature. The resulting dry or wet impregnated cellulose is highly reactive.

In a preferred esterification procedure the dry cellulosic material, impregnated with 20% to 40% of its weight of a mixture of the above-defined compounds in the stated proportions, is placed in a large excess of an organic acid anhydride, e. g., a quantity of acetic anhydride amounting to 10 to 30 times the weight of the cellulose, maintained at its boiling point in a reaction vessel fitted with a reflux condenser. In a few seconds the cellulose becomes highly swollen and begins to go into solution and the reaction mixture refluxes vigorously. In from ½ to 10 minutes after the cellulose has been introduced into the acid anhydride, the cellulose is substantially completely esterified and is in solution in the reaction mixture. The exact time required for completion of the esterification or other reactions depends on the particular impregnants in the cellulose and their proportions, and on the particular acid anhydride or reactant being employed. The resulting solution is poured rapidly with vigorous agitation into about 6.5 times its weight of dilute aqueous acetic acid e. g., 10% acetic acid, at a temperature of about 65° C. The cellulose ester precipitates in the form of fluffy white flocks which, after being stirred for several minutes in the precipitating bath, are filtered out, washed acid-free and dried.

In another esterification procedure, the dry impregnated cellulose, containing from 20% to 40% of its weight of the above-defined impregnants, is placed in a large excess of organic acid anhydride, e. g., 30 parts of acetic anhydride, at room temperature in a reaction vessel and the mixture then heated during a period of 5 to 10 minutes to a temperature of about 90° C. In this embodiment a longer time is required for completion of esterification than when boiling anhydride is employed. The exact time required to produce a substantially completely esterified cellulose depends on the particular types and proportions of impregnants in the pretreated cellulose. Reaction times ranging from about 10 minutes up to 1 to 3 hours are suitable, the shorter times being sufficient when the most effective catalysts, such as urea/ammonium sulfate or morpholinium acetate/morpholinium sulfate, are employed in the higher proportions, and the longer times being required when impregnating mixtures such as ammonium acetate/ammonium sulfate are used.

In still another esterification procedure, which is preferred for the preparation of cellulose esters in fibrous form, the impregnated cellulose is placed in a refluxing mixture of the aliphatic acid anhydride and a nonsolvent for the cellulose ester being produced, such as, for example, xylene. In the preparation of a fibrous cellulose acetate a quantity of acetic anhydride amounting to about 4 times the weight of the cellulose and a quantity of xylene amounting to about 22.5 times the weight of the cellulose is satisfactory. The reaction mixture is maintained at reflux temperature until the cellulose is substantially completely esterified, about 45 minutes being required with an ammonium acetate/ammonium sulfate (30%:10%) impregnated cellulose and only 5 minutes being required with a morpholinium acetate : morpholinium sulfate (36%:4%) impregnated cellulose in the acetic anhydride-xylene mixture described above. At the completion of the reaction, which can be determined by testing the solubility of small samples of the fibrous cellulose acetate in glacial acetic acid, the fibrous product is filtered from excess reaction mixture, washed acid-free and dried by conventional methods.

The cellulosic material used in the practice of this invention can be any of the common types of cellulose such as cotton linters, wood pulp, regenerated cellulose, and the partially substituted cellulose derivatives such as methylcellulose, ethylcellulose, hydroxyethylcellulose, and the like, having substantial proportions of free hydroxyl groups. When regenerated cellulose, such as viscose or cuprammonium yarn is used, the esterification of the impregnated yarn proceeds more gradually than with similarly impregnated linters or wood pulp.

The effect on the chemical reactivity of cellulose of the particular combination of the carboxylic acid compound with the above-defined types of compounds of the inorganic sulfoxy acids is quite surprising. While ammonium salts of various inorganic and organic acids have been disclosed in the prior art as pretreating agents for cellulose to be used in esterification or as catalysts to be employed in esterification mixtures, these reagents, used singly as impregnants, or combined and used as catalysts added to the esterification mixture, do not give the results obtained by the process of this invention. For example, cotton linters impregnated with 40% of their weight of ammonium acetate and subjected to an acetylation of the type described in Example I for a total of 20 hours gives a fibrous insoluble cellulose acetate containing only about 14% combined acetic acid. The white color and fibrous form of the linters are preserved throughout the reaction period. Likewise, cotton linters impregnated with 40% of their weight of ammonium sulfate by itself and treated with boiling acetic anhydride do not react vigorously with evolution of heat. On the other hand, linters impregnated with a mixture of these salts or other mixtures of this invention react vigorously and rapidly. Although an esterified cellulose acetate is obtained after 30 minutes' reaction with linters impregnated with ammonium sulfate only, it is so badly colored and degraded (D. P. of about 20) that it is not useful for the preparation of films, fibers and the like. It has also been observed that the use of mixtures of ammonium salts or amides of carboxylic acids with ammonium or substituted ammonium sulfates as catalysts in the esterification of unimpregnated cellulose does not produce the high reactivity. Impregnation of the celluloses is a critical step of this invention. Furthermore, the substitution of alkali metal salts, such as potassium salts, for the ammonium salts used in the process of this invention does not produce highly reactive celluloses.

The highly reactive impregnated celluloses of this invention are rapidly esterified with lower aliphatic acid anhydrides at temperatures above 90° C. Examples of such anhydrides which are particularly useful include acetic and propionic anhydrides. For a homogeneous esterification a quantity of anhydride amounting to about 30 times the weight of the cellulose is very suitable, the excess anhydride serving as a solvent for the cellulose acetate formed in the reaction. However, smaller amounts, e. g., 10 or 20 times the weight of the cellulose, can be used, if desired. Smaller amounts of anhydride can also be used when inert solvents such as dioxane are employed. In the latter case a quantity of anhydride amounting to only 8 times the weight of cellulose is suitable. In the heterogeneous method of esterification, in which the cellulose ester formed retains the fibrous structure of the original cellulose, a quantity of anhydride amounting to at least two times the weight of the cellulose is employed, together with sufficient hydrocarbon diluent, for example, benzene, toluene, xylene or aliphatic hydrocarbons, to prevent the cellulose ester from dissolving in the reaction mixture. In the case of acetylation in the presence of xylene a quantity of acetic anhydride amounting to 4 times and a quantity of xylene amounting to 20 to 25 times the weight of the cellulose are very satisfactory.

The time required for substantially fully esterifying or otherwise modifying the pretreated cellulose of this invention depends on the particular anhydride or reactant, the temperature of the esterifying or reaction mixture and on the particular impregnants in the cellulose. For example, with the more effective impregnants and with a homogeneous acetylation system, esterification is completed in ½ to 5 minutes at 140° C. and in from 15 minutes to 2 hours at 90° C. When urea is used as the organic acid amide in the impregnated cellulose there is a waiting period of from about ½ to 15 minutes' duration from the time the cellulose and acid anhydride are mixed together before the rapid esterification begins. The exact length of the "waiting period" depends on the temperature at which the esterification is carried out, the longer times being at the lower temperatures. With higher anhydrides such as propionic and butyric anhydrides, both the "waiting period" and the esterification period are longer than in the case of acetylation at the same temperature. When a heterogeneous esterification system involving a lower ratio of anhydride is employed, the reaction times are slightly longer for the same impregnants, the same acid anhydride, and the same reaction temperature.

The coagulation of the cellulose ester formed in homogeneous systems is preferably carried out by pouring the mixture into a large excess of a dilute aqueous aliphatic acid solution at elevated temperature, for example, at 50° to 75° C. This type of precipitation gives a flocculent, porous product. If a harder, granular product is desired the precipitation can be carried out in dilute aliphatic acid solutions at room temperature. A 10% aqueous acetic acid solution is satisfactory for this purpose; however, higher concentrations of acetic acid, e. g., up to 15% or 20% can be used for precipitating cellulose esters of the higher degrees of polymerization. If desired, the cellulose ester can be coagulated in non-aqueous liquids, such as ethers, and aromatic or aliphatic hydrocarbons, which are non-solvents for the cellulose ester.

Particular attention has been given to the description of this invention in respect to esterification reactions. This has been done for simplification, since a standard was required in order to determine the relative effectiveness of the numerous carboxylic acid compounds and inorganic sulfoxy compounds in a multitude of combinations. Similar comparisons could be given for other reactions. For example, in addition to being useful for the preparation of cellulose esters, the impregnated celluloses of this invention are also useful for the preparation of cellulose acetals by reaction with aldehydes such as acetaldehyde and formaldehyde. The cellulose esters produced from the impregnated celluloses of this invention are useful in the manufacture of films, fibers, coating compositions, molding compositions, and the like.

Any departure from the above description which conforms to the present invention is intended to be included within the scope of the claims.

I claim:

1. A process for the preparation of cellulose derivatives which comprises impregnating cellulosic materials with a mixture of a carboxylic acid compound selected from the group consisting of carboxylic acid amides, carboxylic acid ammonium salts and carboxylic acid amine salts, said amine having at least one amino hydrogen, and a compound of an inorganic sulfoxy acid selected from the group consisting of sulfuric acid, partial esters and amides thereof, sulfurous acid, thiosulfuric acid, tetrathionic acid, persulfuric acid, and salts of said acids with ammonia and amines having at least one amino hydrogen; and esterifying the resultant impregnated cellulose with a lower aliphatic acid anhydride.

2. A process in accordance with claim 1 wherein the total concentration of said carboxylic acid compound and said compound of an inorganic sulfoxy acid is at least 10% based on the cellulose.

3. A process in accordance with claim 1 wherein the total concentration of said carboxylic acid compound and said compound of an inorganic sulfoxy acid is 20% to 40% based on the cellulose.

4. A process in accordance with claim 1 wherein the ratio of said carboxylic acid compound to said compound of an inorganic sulfoxy acid is between 80:1 and 1:3.

5. A process in accordance with claim 1 wherein the total concentration of said carboxylic acid compound and said compound of an inorganic sulfoxy acid is from 20% to 40% based on the weight of cellulose and the ratio of said carboxylic compound and to said compound of an inorganic sulfoxy acid is between 40:1 and 3:1.

6. Fibrous cellulose impregnated with a carboxylic acid compound selected from the group consisting of carboxylic acid amides, carboxylic acid ammonium salts and carboxylic acid amine salts, said amine having at least one amino hydrogen, and a compound of an inorganic sulfoxy acid selected from the group consisting of sulfuric acid, partial esters and amides thereof, sulfurous acid, thiosulfuric acid, tetrathionic acid, persulfuric acid, and salts of said acids with ammonia and amines having at least one amino hydrogen, the total concentration being from 20% to 40% of the weight of said cellulose and the ratio of said carboxylic acid compound to said compound of inorganic sulfoxy acid being from 40:1 to 3:1.

7. A process for the preparation of cellulose derivatives which comprises impregnating cellulosic materials with a mixture of urea and sulfuric acid and esterifying the resultant impregnated cellulose with acetic anhydride.

8. A process in accordance with claim 7 in which the said impregnant is used in a total concentration of 20% to 40% based on the cellulose and the ratio of said urea to said sulfuric acid is between 40:1 and 3:1.

9. A process for the preparation of cellulose derivatives which comprises impregnating cellulosic materials with a mixture of urea and ammonium sulfate and esterifying the resultant impregnated cellulose with acetic anhydride.

10. A process in accordance with claim 9 in which the said impregnant is used in a total concentration of 20% to 40% based on the cellulose and the ratio of said urea to said ammonium sulfate is between 40:1 and 3:1.

11. A process for the preparation of cellulose derivatives which comprises impregnating cellulosic materials with a mixture of ammonium acetate and ammonium sulfate and esterifying the resultant impregnated cellulose with acetic anhydride.

12. A process in accordance with claim 11 in which the said impregnant is used in a total concentration of 20% to 40% based on the cellulose and the ratio of said ammonium acetate to said ammonium sulfate is 40:1 and 3:1.

13. Fibrous cellulose in accordance with claim 6 in which said carboxylic acid compound is urea and said sulfoxy acid compound is sulfuric acid.

14. Fibrous cellulose in accordance with claim 6 in which said carboxylic acid compound is urea and said sulfoxy acid compound is ammonium sulfate.

15. Fibrous cellulose in accordance with claim 6 in which said carboxylic acid compound is ammonium acetate and said sulfoxy acid compound is ammonium sulfate.

JOHN CUNNINGHAM THOMAS.

REFERENCES CITED

The following references are of record in the file of this patent:

UNITED STATES PATENTS

| Number | Name | Date |
|---|---|---|
| 2,172,447 | Marschall | Sept. 12, 1939 |
| 2,391,569 | Haney et al. | Dec. 25, 1945 |
| 2,415,112 | Seymour et al. | Feb. 4, 1947 |

FOREIGN PATENTS

| Number | Country | Date |
|---|---|---|
| 315,435 | Great Britain | July 31, 1930 |
| 381,991 | Great Britain | Oct. 20, 1932 |
| 516,698 | Great Britain | Jan. 9, 1940 |

OTHER REFERENCES

Little: "Flameproofing Textile Fabrics," Reinhold Publishing Co., New York, New York, 1947, pages 179–217.

Ser. No. 326,497, Groen (A. P. C.), published April 20, 1943.